US009736874B2

(12) United States Patent
Sartori et al.

(10) Patent No.: US 9,736,874 B2
(45) Date of Patent: Aug. 15, 2017

(54) SYSTEM AND METHODS FOR CONTROLLING OUT-OF-NETWORK D2D COMMUNICATIONS

(71) Applicant: Futurewei Technologies, Inc., Plano, TX (US)

(72) Inventors: Philippe Sartori, Plainfield, IL (US); Vipul Desai, Palatine, IL (US); Mazin Al-Shalash, Frisco, TX (US); Anthony C. K. Soong, Plano, TX (US); George Calcev, Hoffman Estates, IL (US); Brian Classon, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/274,697

(22) Filed: May 10, 2014

(65) Prior Publication Data

US 2014/0335853 A1 Nov. 13, 2014

Related U.S. Application Data

(60) Provisional application No. 61/822,119, filed on May 10, 2013.

(51) Int. Cl.
*H04B 17/00* (2015.01)
*H04J 3/06* (2006.01)
(Continued)

(52) U.S. Cl.
CPC ......... *H04W 76/023* (2013.01); *H04W 4/005* (2013.01); *H04W 8/005* (2013.01); *H04W 56/002* (2013.01); *H04W 56/0015* (2013.01)

(58) Field of Classification Search
CPC . H04W 8/005; H04W 48/16; H04W 56/0015; H04W 72/02; H04W 76/023
(Continued)

(56) References Cited

U.S. PATENT DOCUMENTS 9,042,267 B2 * 5/2015 Bill ............................ 370/254
9,072,033 B2 * 6/2015 Mehta ........................ 370/254
(Continued)

FOREIGN PATENT DOCUMENTS

EP 1976165 A2 10/2008
EP 2928257 A1 10/2015
(Continued)

OTHER PUBLICATIONS

International Search Report and Written Opinion, Application No. PCT/US0214/037607, mailed Oct. 10, 2014, 8 pages.
(Continued)

*Primary Examiner* — Rafael Pérez-Gutiérrez
*Assistant Examiner* — Mark G. Pannell
(74) *Attorney, Agent, or Firm* — Slater Matsil, LLP

(57) ABSTRACT

Embodiments are provided herein for determining a synchronizing master for device-to-device (D2D) communication in a cellular network environment. In an embodiment, a user equipment (UE) receives a discovery signal comprising a timing reference, and determines a transmitter of the discovery signal. In accordance with the determination of the transmitter of the discovery signal, the UE performs one of synchronizing to the timing reference in the discovery signal and transmitting a second discovery signal. The UE performs the synchronizing to the timing reference if the transmitter of the discovery is a cellular network. Alternatively, the UE transmits the second discovery signal upon determining that the transmitter of the discovery signal is a second UE that is out of coverage of a cellular network.

18 Claims, 8 Drawing Sheets

(51) Int. Cl.
  *H04L 12/28* (2006.01)
  *H04M 11/00* (2006.01)
  *H04W 76/02* (2009.01)
  *H04W 56/00* (2009.01)
  *H04W 8/00* (2009.01)
  *H04W 4/00* (2009.01)

(58) Field of Classification Search
  USPC .......................................... 455/426.1, 522.1
  See application file for complete search history.

(56) References Cited

U.S. PATENT DOCUMENTS

| | | | |
|---|---|---|---|
| 2005/0148315 A1* | 7/2005 | Sawada | H04B 7/2606 455/403 |
| 2008/0194287 A1* | 8/2008 | Narang et al. | 455/552.1 |
| 2009/0010231 A1 | 1/2009 | Laroia et al. | |
| 2009/0196277 A1 | 8/2009 | Horn et al. | |
| 2010/0135176 A1* | 6/2010 | Kazmi et al. | 370/252 |
| 2010/0165882 A1 | 7/2010 | Palanki et al. | |
| 2012/0011247 A1* | 1/2012 | Mallik et al. | 709/224 |
| 2012/0039314 A1* | 2/2012 | Osborn et al. | 370/338 |
| 2012/0093098 A1 | 4/2012 | Charbit et al. | |
| 2012/0224568 A1 | 9/2012 | Freda et al. | |
| 2013/0083779 A1 | 4/2013 | Ahn et al. | |
| 2013/0183905 A1* | 7/2013 | Richardson | H04W 56/0015 455/67.11 |
| 2015/0133049 A1* | 5/2015 | Lee et al. | 455/41.1 |
| 2015/0163729 A1* | 6/2015 | Seo et al. | 370/336 |
| 2015/0181406 A1* | 6/2015 | Seo et al. | 370/329 |
| 2015/0181633 A1* | 6/2015 | Kim et al. | 370/329 |

FOREIGN PATENT DOCUMENTS

| | | |
|---|---|---|
| WO | 2007082255 A2 | 7/2007 |
| WO | 2015006082 A1 | 1/2015 |
| WO | 2015169768 A1 | 11/2015 |

OTHER PUBLICATIONS

3GPP, 3rd Generation Partnership Project; Technical Specification Group Services and Ssytem Aspects; Feasibility study for Proximity Services (ProSe) (Release 12), 3GPP TR 22.803 V12.0.0, Dec. 2012, 40 pages.

* cited by examiner

SYSTEM AND METHODS FOR CONTROLLING OUT-OF-NETWORK D2D COMMUNICATIONS

This application claims the benefit of U.S. Provisional Application No. 61/822,119 filed on May 10, 2013 by Philippe Sartori et al. and entitled "System and Method for a Controller for Out-of-Network D2D Communications," which is hereby incorporated herein by reference as if reproduced in its entirety.

TECHNICAL FIELD

The present invention relates to the field of wireless network communications, and, in particular embodiments, to a system and methods for controlling out-of-network device-to-device (D2D) communications.

BACKGROUND

Device-to-Device (D2D) technology is getting attraction because of the ability to offer new services, improve system throughput, and offer a better user experience. One aspect of D2D technology that appears promising is D2D proximity discovery. With D2D proximity discovery, user equipments (UEs) attempt to discover neighboring UEs or other entities. This information can be used for improving communications performance in various scenarios, and achieve better social networking (e.g., in Social, Local, Mobile environment, also referred to as SOLOMO), personalized advertising, and other applications. Potential use cases for D2D also include the proximity-based services (ProSe)-enabled public safety UE as described by in the 3rd Generation Partnership Project (3GPP) Technical Report (TR) 22.803 V12.0.0. There is a need for efficient methods for controlling D2D communications in such and other relevant scenarios.

SUMMARY OF THE INVENTION

In accordance with an embodiment, a method by a user equipment (UE) for selecting a synchronization master for device-to-device (D2D) communication include receiving a discovery signal comprising a timing reference, and determining a transmitter of the discovery signal. The method further includes, in accordance with the determination of the transmitter of the discovery signal, performing one of synchronizing to the timing reference in the discovery signal and transmitting a second discovery signal.

In accordance with another embodiment, a UE for selecting a synchronization master for D2D communication comprises at least one processor and a non-transitory computer readable storage medium storing programming for execution by the at least one processor. The programming includes instructions to receive a discovery signal comprising a timing reference, and determine a transmitter of the discovery signal. In accordance with the determination of the transmitter of the discovery signal, the UE is configured to perform one of synchronizing to the timing reference in the discovery signal and transmitting a second discovery signal.

In accordance with another embodiment, a method by a UE for selecting a synchronization master for D2D communication includes receiving a discovery signal identifying a second UE, and identifying a signal quality of the discovery signal. A second discovery signal is transmitted in accordance with the signal quality. The second discovery signal indicating a timing reference allowing time synchronization between the UE and the second UE.

In accordance with yet another embodiment, a UE for selecting a synchronization master for D2D comprises at least one processor and a non-transitory computer readable storage medium storing programming for execution by the at least one processor. The programming includes instructions to receive a discovery signal identifying a second UE, and identify a signal quality of the discovery signal. The programming includes further instructions to, in accordance with the signal quality, transmit a second discovery signal, the second discovery signal indicating a timing reference allowing time synchronization between the UE and the second UE.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Potential use cases for D2D have been identified by the 3GPP System Aspects (SA) Work Group 1 (WG1) in 3GPP TR 22.803 V12.0.0 dated December 2012. For example, paragraph 55 of the 3GPP TR 22.803 states: "A ProSe-enabled public safety UE with ProSe Discovery enabled shall be able to discover other discoverable public safety UEs when some or all of the UEs involved in ProSe Discovery are out of network coverage". Other requirements relevant to out-of-network coverage (OOC) devices are also listed. Paragraph 58 of the 3GPP TR 22.803 states: "Two public safety UEs shall be capable of establishing a secure direct connection and exchange user traffic on public safety spectrum dedicated to ProSe services, assuming they are in radio range, are authenticated and authorized". Paragraph 65 states: "An authorized public safety UE may be capable of acting as a relay for other public safety UEs". Further, paragraph 61 states: "A Public Safety UE shall be capable of transmitting data to a group of Public Safety UEs using ProSe Group Communications with a single transmission, assuming they are within transmission range, authenticated and authorized".

While paragraph 61 of the 3GPP TR 22.803 V12.0.0 (2012-12) does not mention OOC, it is relevant since it applies to OOC units. When two devices are OOC, it is necessary to establish one as the master controller in order to provide efficient means for D2D communication. Embodiments are provided herein for establishing D2D communications by determining a master controller. Multiple master devices may be established for different aspects of D2D communications. The masters may be different, depending on the functionality. For instance, there might be one master for timing but a different master for resource allocation.

Figure 1:
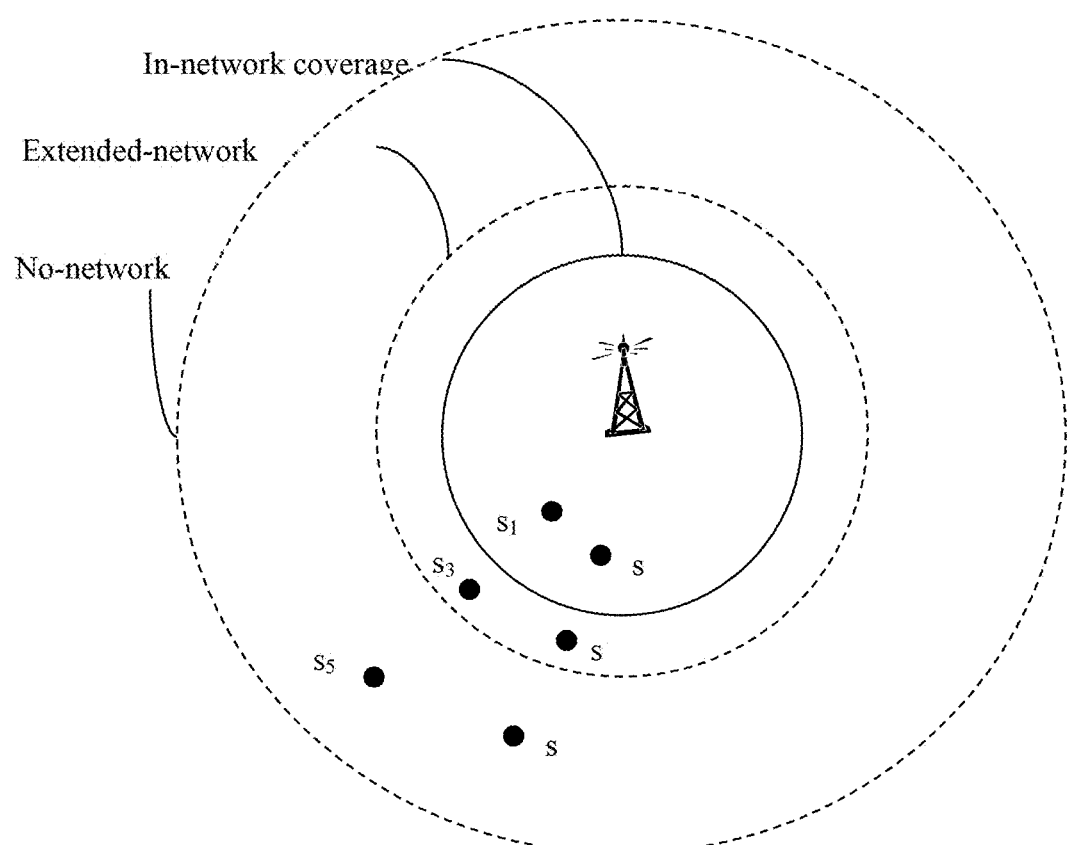
FIG. 1 is a diagram that illustrates devices operating in a network arrangement.

Based on the descriptions of the proximity-based services (ProSe), it is possible to envision scenarios based on device location relative to the position of a communications controller, e.g., an evolved nodeB (eNB) or other base station technologies/systems or network access radio nodes. FIG. 1 shows six devices, labeled $s_1$ to $s_6$, located in various regions about an eNB. Devices $s_1$ and $s_2$ are in-network coverage (IC), which implies they can establish communication links with the eNB. Devices $s_5$ and $s_6$ are out-of-network coverage (OOC), implying they cannot establish any direct communication link with the eNB. There may be a region, referred to as extended-network coverage, where devices, such as $s_3$ and $s_4$, may observe some transmissions from the eNB but they may not be able to establish a communication link with the eNB. The devices can be any user equipment (UE) capable of exchanging wireless signals with the eNB. Examples of the devices include smart phone, computer tablets, computer laptops, sensor devices (e.g., smart watches), or other mobile and wireless communication devices.

Since public safety cases have specified certain features, there is a need to define behavior with these coverage regions. With public safety devices, it is possible that there is a separate timing master and a resource master. Rules are needed for governing who and when a device becomes a timing master and when a device becomes a resources master. Table 1 shows a mapping of FIG. 1 to those cases.

TABLE 1

Mapping FIG. 1 to ProSe Cases.

| Case | ProSe Case | Devices | Discovery scenario | Communication scenario | Timing Master | Resource Master |
|---|---|---|---|---|---|---|
| 1 | PR.53, PR.58 | $s_1, s_2$ | ($s_1, s_2$) discover each other | ($s_1, s_2$) communicate to each other | eNB | eNB |
| 2 | | $s_3, s_4$ | ($s_3, s_4$) discover each other but not any devices in the in-network coverage region | ($s_3, s_4$) communicate to each other without interfering in-network devices | eNB | x |
| 3 | | $s_1, s_3$ | ($s_1, s_3$) discover each other | | eNB | eNB with $s_1$ as relay |
| 4 | 5.2.10.3, PR.69, PR.72 | $s_1, s_2, s_3$ | Pairs ($s_1, s_3$) and ($s_2, s_3$) can discover each other but $s_1$ cannot discover $s_2$ | | eNB | eNB with $s_1$ or $s_2$ as relay |
| 5 | | $s_5, s_6$ | ($s_5, s_6$) discover each other | | X | x |
| 6a | | $s_3, s_5, s_6$ | Pairs ($s_5, s_6$) and ($s_3, s_5$) discover each other but $s_3$ cannot discover $s_6$ | | $s_3$ | |
| 6b | 5.2.9 | $s_3, s_5, s_6$ | Pairs ($s_5, s_6$) and ($s_3, s_5$) discover each other but $s_3$ cannot discover $s_6$ | | $s_3$ | |
| 7 | 5.2.9 | $s_1, s_5, s_6$ | Pairs ($s_1, s_6$) and ($s_1, s_5$) discover each | | eNB | $s_1$ |

TABLE 1-continued

Mapping FIG. 1 to ProSe Cases.

| Case | ProSe Case | Devices | Discovery scenario | Communication scenario | Timing Master | Resource Master |
|------|------------|---------|--------------------|-----------------------|---------------|-----------------|
| | | | other but $s_5$ cannot discover $s_6$ | | | |

It is useful to define three scenarios that cover various possibilities for device discovery when at least one device is OOC (e.g., $s_5$ and/or $s_6$). In the following scenarios, two devices, $D_1$ and $D_2$, are attempting to establish a link between each other. The problem for these two devices is to determine which device will be the master and which device will be the slave. Further related to this problem is how a device classifies itself (e.g., IC, OOC, or extended-network coverage). The classification is described further below.

Figure 2:
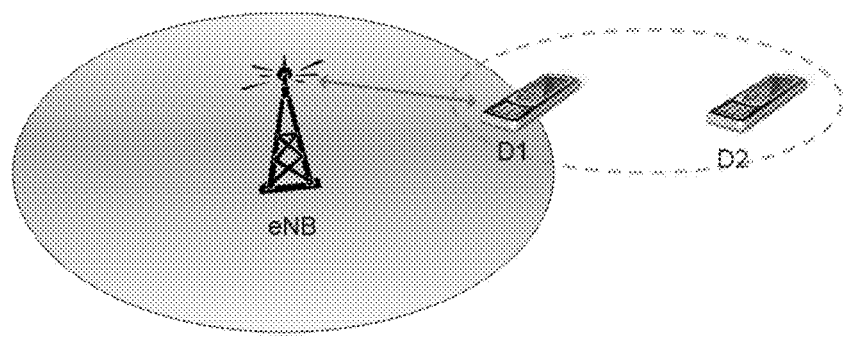
FIG. 2 is a diagram that illustrates a scenario for D2D communications.

In one scenario, referred to herein as scenario 1, $D_1$ is in-coverage and $D_2$ is out-of-coverage. This scenario is illustrated in FIG. 2. In such a case, $D_1$ is established as the master, and $D_2$ is the slave. Since $D_1$ is IC (e.g., corresponding to $s_1$ in FIG. 1), $D_1$ can communicate with the eNB. Thus, $D_1$ is in a privileged position to provide authentication and security functions. Furthermore, $D_1$ could also serve as a relay to enable $D_2$ (e.g., corresponding to $s_5$ in FIG. 1) to link with the eNB. $D_1$ can be made at least one of a timing master and a resource allocation master for $D_2$. By acting as a relay, $D_1$ can help minimize potential interference to the cellular system by conveying which resources $D_2$ can use.

For scenario 1, it is assumed that $D_1$ and $D_2$ belong to the same D2D class, e.g., both are public safety UEs or both are consumer Long Term Evolution (LTE) devices. One variation of this scenario, referred to herein as scenario 1a, is where $D_1$ and $D_2$ belong to different D2D classes. For instance, $D_1$ can be a consumer unit and $D_2$ a public safety (PS) unit. As explained further below, solutions for scenario 1a may be slightly different than for scenario 1.

Figure 3:
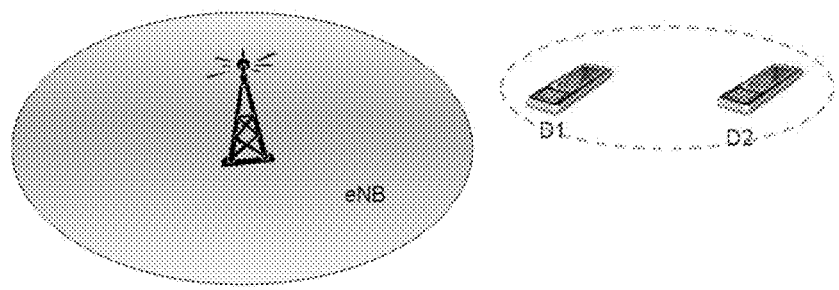
FIG. 3 is a diagram that illustrates another scenario for D2D communications.

Another scenario, referred to herein as scenario 2, is illustrated in FIG. 3. In this scenario, neither $D_1$ nor $D_2$ has a possible link with an eNB. $D_1$ could correspond to $s_5$ in FIG. 1, while $D_2$ corresponds to $s_6$. In such a case, the master-slave determination may be arbitrary. There are two sub-scenarios. In one sub-scenario, referred to herein as scenario 2a, $D_1$ already is a master for communication with devices other than $D_2$. In such a case, $D_1$ retains its role as the master and $D_2$ becomes the slave. This scenario can be applicable for cases where group communication is desired. In another sub-scenario, referred to herein as scenario 2b, neither $D_1$ nor $D_2$ is a master. In such a case, a negotiation process can be enabled between the two devices to determine which one is designated as the master.

In some cases for scenario 2a, it may be advantageous to operate as in scenario 2b. For example, this is the case when only single point-to-single point communication is possible. In that case, operating as in scenario 2b may be desirable in some situations. In a third possible scenario, referred to herein as scenario 3, both devices (e.g. $s_1$ and $s_2$ in FIG. 1) are IC. In this case, it is not always necessary to establish a master and a slave. The master role can be assumed by the eNB. However, if desired, IC operation can be similar to scenario 1 or scenarios 2a/2b.

The master entity provides guidelines for slave devices to follow. As described above, there can be two types of masters: timing master and resources master. A timing master provides information for devices to adjust their timing (and possible frequency) to that of the master. The device may employ tracking loops for the adjustment. Among the benefits of a timing master is to enable synchronized transmissions, manage power consumption, simplify protocols, and increase throughput. A resources master manages the communication link such as when devices can transmit, which resources to use, and how many resources are allocated per device. An eNB is one example where the timing master and resources master are the same entity.

To determine a master in scenario 1 above, $D_1$ transmits a signal that identifies $D_1$ as either already a master or an IC device. $D_2$ transmits a signal that identifies it as an OOC, non-master device. Upon mutual discovery between $D_1$ and $D_2$, $D_1$ then knows that it is the master and $D_2$ knows that it is the slave. One possibility is to have the discovery signal used for this master/slave identification, as shown below. The discovery signal would thus serve as a synchronization message between the master and slave device. However, other signals with transmission properties similar to the discovery signal could also be used for the same purpose. Examples of other signals can include a family of synchronization signals, where each member of the family can indicate the synchronization state of the device, such as in-coverage or out-of-coverage.

Figure 4:
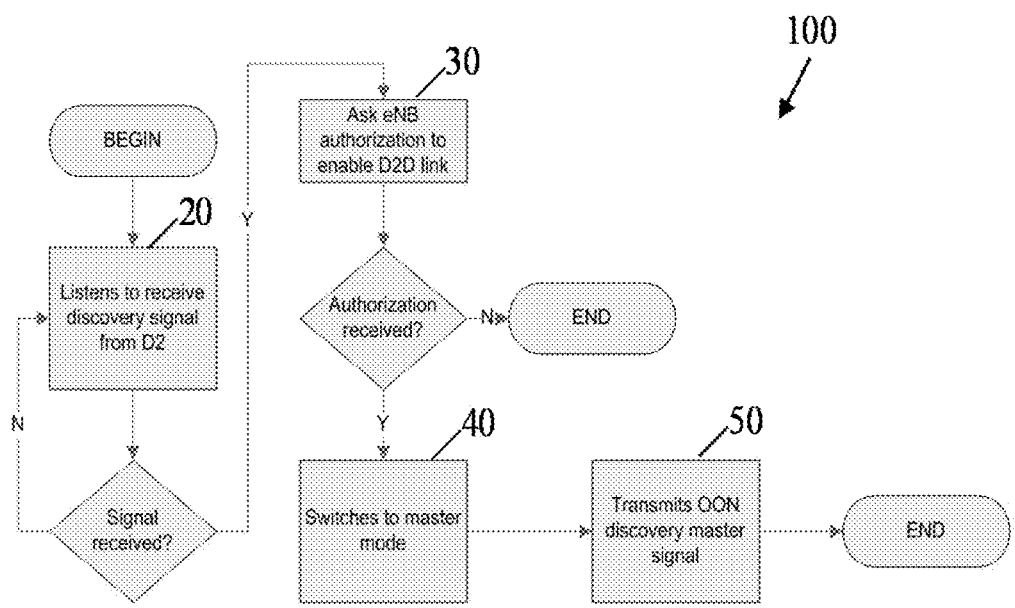
FIG. 4 is a flowchart that illustrates a method embodiment of a device operation for D2D communications.
Figure 5:
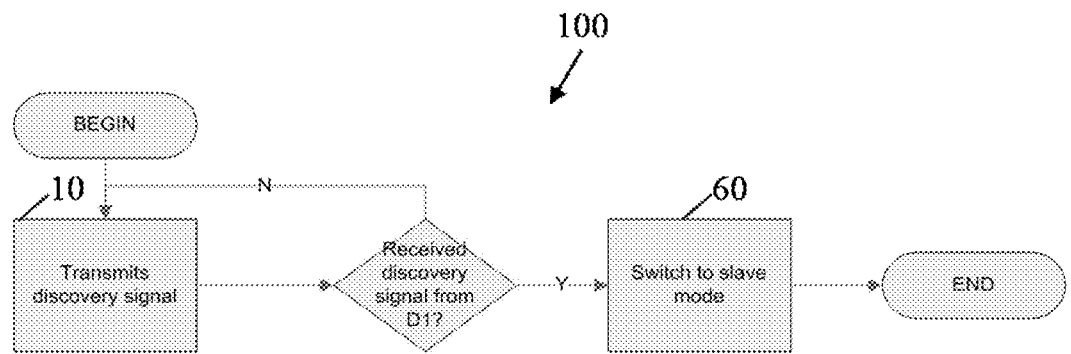
FIG. 5 is a flowchart that illustrates another method embodiment of a device operation for D2D communications.

FIGS. 4 and 5 show the operations of $D_1$ and $D_2$, respectively, as part of an embodiment method 100 to determine the master and slave for D2D communications according to scenario 1 above. At step 10, $D_2$ transmits an OOC discovery signal. At step 20, $D_1$ listens and receives the discovery signal from $D_2$. At step 30, $D_1$ checks with the eNB in order to get the approval to enable the D2D link. In order to establish a D2D link between two devices, the devices need to synchronize to timing reference with an eNB (or a cellular network) or to a device in coverage of the cellular network (at one or more hops of the eNB). This step can involve the exchange of higher layer messages, e.g. radio resource control (RRC) messages between $D_1$ and the eNB. If the eNB in step 30 approves $D_1$ to enable a D2D link, then $D_1$ switches to master state (if not already in master state) at step 40. Otherwise, the method 100 ends. In an alternative embodiment to step 30, the eNB can broadcast a D2D configuration, e.g., via higher layer parameters in a system information broadcast (SIB) message. Examples of higher layer parameters can include when (which subframes) to transmit, and which resources (resource blocks) to use. Upon receiving the discovery signal from $D_2$, $D_1$ can examines its received configuration to see whether it is authorized to switch to a master mode. $D_1$ may also inform the eNB that $D_1$ has switched to master mode so that the eNB can be aware of the role of $D_1$. After step 40, $D_1$ transmits a discovery signal indicating itself as an in-network master at step 50. When $D_2$ receives the signal from $D_1$, $D_2$ switches to slave state at step 60.

There may be cases where $D_2$ is not under coverage, but with additional signal processing, could receive enough information from the eNB to obtain subframe timing synchronization. For instance, the eNB can send a broadcast beacon (e.g., very long range beacon (VLRB)) at very low modulation coding scheme (MCS) which is received far beyond the typical data coverage (for instance part of a physical broadcast channel (PBCH)). Another solution is to have the eNB transmitting a narrowband signal at higher power than for wideband transmission. A device not in coverage may hear this beacon but cannot establish a link with the network because it is too far away. However, such device can establish coarse synchronization to know approximately the periods when the IC devices are listening to out-of-coverage (OOC) devices. As a result, the OOC device can transmit the discovery signal only in those periods. In this way the probability of signal collisions is decreased and the battery power is conserved. The power of the VLRB can be controlled such that if a device is able to decode, then the device potentially can be heard by an IC device. For instance, the power of the VLRB can be selected so that it is received at twice the maximum coverage radius. A device that is unable to decode (hear) the VLRB has a very low chance to be heard by an IC device. The VLRB would allow the distinction between devices OOC in scenario 1 and scenario 2.

A relatively simple process to achieve this distinction is by configuring the device to monitor the primary synchronization signals (PSS)/secondary synchronization signals (SSS) on several transmission instances in order to receive a higher-power overall PSS/SSS. The PSS/SSS can be transmitted periodically by the eNB, for instance every 5 milliseconds (ms). This provides the device with multiple transmission instances to receive a higher-power overall PSS/SSS. Aggregating the PSS/SSS signal received over multiple subframes effectively provides repetition coding. As such, the multi-frame PSS/SSS signal serves a VLRB. The PSS/SSS processing can be done in the time domain, so there is no need to have fine synchronization and perform a fast Fourier transform (FFT) to operate in the frequency domain.

Figure 11:
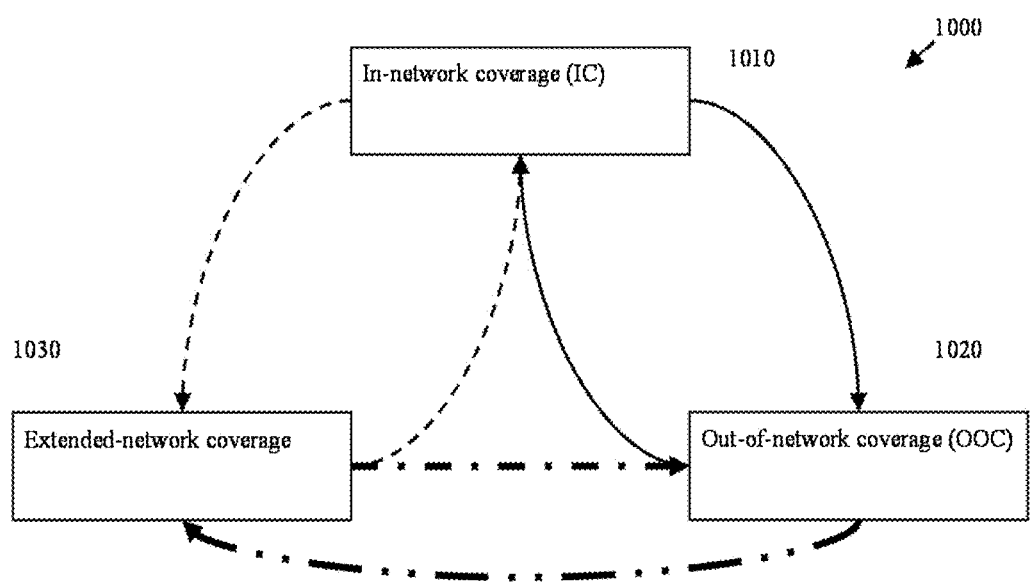
FIG. 11 is a diagram that illustrates states of network coverage.

FIG. 11 shows a state machine 1000 that describes how a device transitions among the three types of coverage: in-network 1010, extended-network 1030, and out-of-coverage 1020. The extended-network coverage state 1030 may not exist for some devices, possibly due to device capabilities, and is shown for completeness. A device may monitor its state periodically in order to determine its behavior for master/slave operation. Due to mobility, a device may transition between states 1010, 1020, and 1030. For example, upon power up, a device may start in the OOC state 1020. A device can follow rules for cell search to determine whether it is in-network coverage and thus can transition from state 1020 to state 1010. If the device recognizes some signals, such as the very long range beacon, the device may transition to state 1030 from state 1020.

Figure 12:
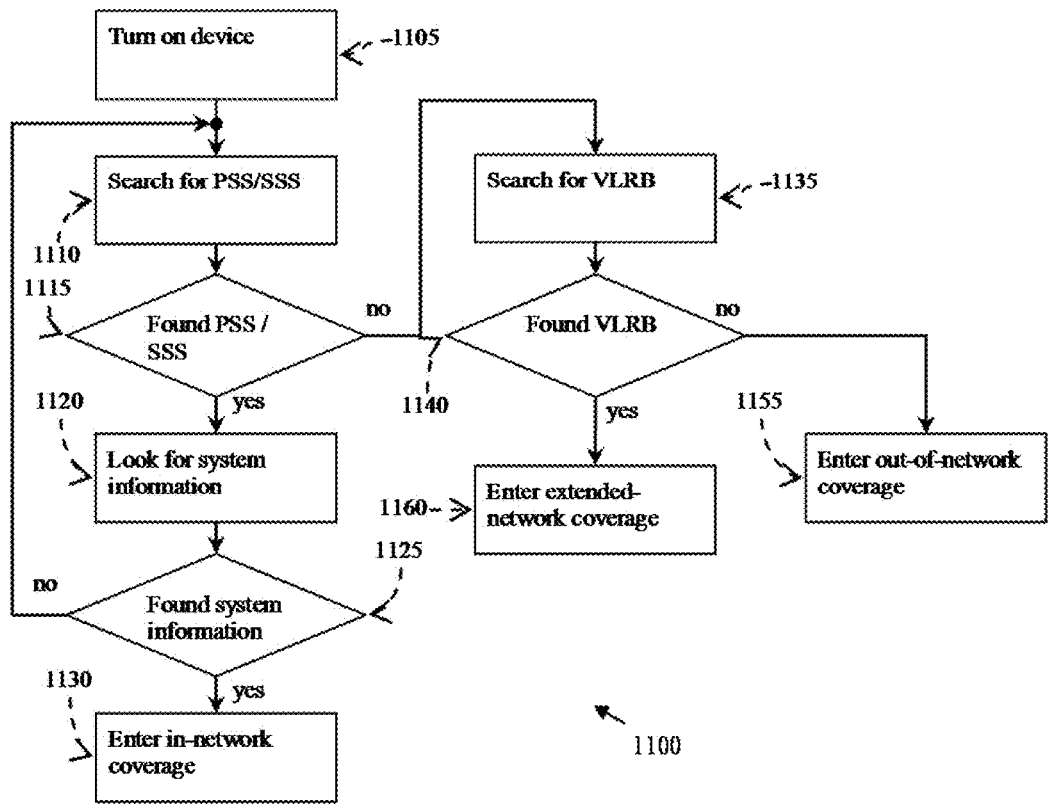
FIG. 12 is a flowchart that illustrates an example method for the determination of a device state from power up.

FIG. 12 shows an exemplar embodiment of a method 1100 for the determination of a device state from power up. Other embodiments can also be used to determine the transition for other states. In the method 1100, after turning on the device in step 1105, the device searches for a PSS/SSS sent from an eNB in step 1110. In step 1110, timers/counters may be used to keep track of the duration of the search. In condition step 1115, if a PSS/SSS is found ('yes'), the device can attempt to acquire system information in step 1120. If system information is determined to be found in step 1125, the device can classify itself as an in-network coverage device in step 1130 (corresponding to state 1010 in FIG. 11). If no system information is found, the flow in step 1125 loops back to 1110 for further searching of PSS/SSS. In step 1115, if the search of PSS/SSS is exhausted (e.g., timer expiry, counter limit reached), the device may perform a search for the VLRB in step 1135. In step 1140, if a VLRB is found, the device may classify itself as extended-network coverage in step 1160 (corresponding to state 1030 in FIG. 11). If no VRLB is found in step 1140, the device may classify itself as out-of-network coverage in step 1155. This is one example for determining the device state from power up and other variations to the steps above may also be used.

A plurality of considerations may also be addressed. For instance, step 30 above may not be needed or may be performed beforehand. Further, if the eNB in step 30 does not approve $D_1$ to establish a D2D link, $D_1$ may transmit a signal indicating its inability as being a master. Another possible action is that $D_1$ may not transmit any D2D signal. In addition to the discovery signal intended for $D_2$, $D_1$ may also participate in an IC discovery process. In that case, the discovery sequences may be different. For instance, there may be two sets of sequences: one set for IC discovery and another for OOC discovery. Alternatively, there could be a single set of sequences, and optionally, an added bit/flag to indicate the IC/OOC discovery process. The IC discovery process may be synchronized, whereas the OOC discovery process may be unsynchronized. This makes the OOC discovery process more challenging.

In addition to the discovery signal, $D_1$ may also include (transmit) additional information, such as $D_1$ ID, the Public Land Mobile Network (PLMN), the eNB ID, and/or other relevant information. In step 50 above, the master device may not need to indicate itself as being IC. The device can also include other information, such as the number of hops (hop count) to the network. For example, a UE may find it beneficial to associate with a master with the lowest number of hops. Further, it is possible that the method 100 may trigger several potential masters, which can be solved in various ways. For example, if step 30 is included, the eNB is in control to determine which device will act as the single master. If step 30 is not present, simple resolution rules can be put in place to resolve conflicts, such as having the $D_2$ select the device from which it receives the first response as master, or select the one with the lowest device ID, best power, and/or other suitable criteria. In order to ensure robustness, $D_2$ may be required to send an acknowledgement to avoid two devices mistakenly acting as masters.

In an embodiment, if the eNB detects a "I am a slave" message, it can trigger some IC devices to send the "I am a master message". In one implementation, a potential IC master may not send any 'I am a master" signal without being prompted (configured) by the eNB. In such a situation, this makes the eNB the decision-maker in the master-slave establishment. This may require the eNB to receive signals at very low power (lower power than what the IC UE may receive). This solution could be enabled by using the "listening RS" mechanism for small cells, for example.

Figure 6:
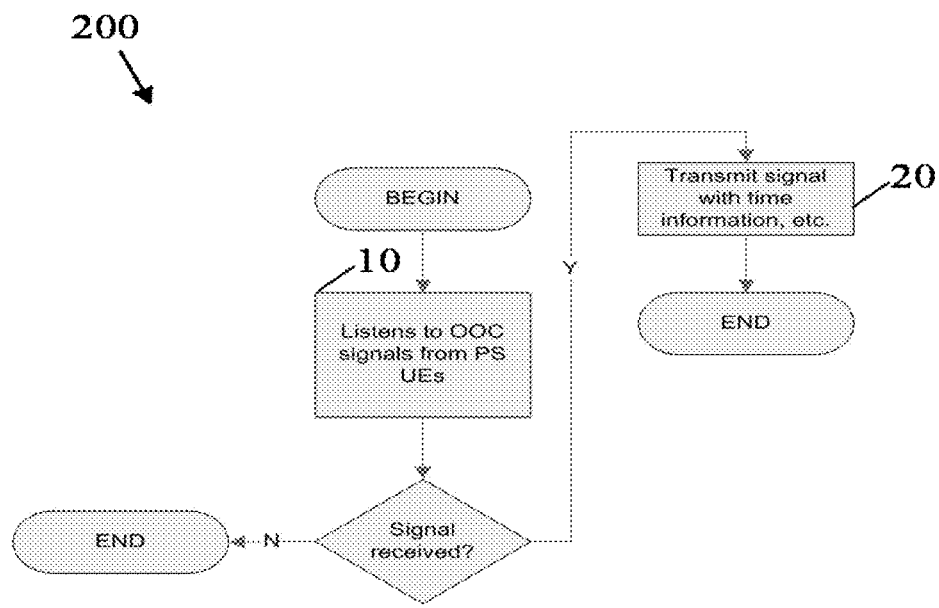
FIG. 6 is a flowchart that illustrates another method embodiment of a device operation for D2D communications.

FIG. 6 shows the operation of $D_1$ as part of a modified method 200 to determine a master and slave for D2D communications according to scenario 1a above. The method 200 considers the case where $D_1$ is a consumer LTE UE and $D_2$ is a public safety UE. In that case, for safety reasons, it is not desirable to have $D_1$ and $D_2$ establish a master-slave relationship. However, there are benefits in having $D_2$ getting timing information from $D_1$, and even possibly resource allocation messages. At step 10, $D_1$ listens for an OOC discovery signal. If $D_2$ transmits an OOC signal, then $D_1$ receives the OOC signal and sends, at step 20, a message (similar to a discovery signal) indicating time information, frequency information, radio resource information, and/or other relevant information.

In the method 200, although D2 obtains information from D1, there is no master-slave relationship established since the two UEs belong to a different category. This process has to be done carefully, e.g., in a safer manner than the method 100, to make sure that a rogue UE does not give misleading information to the public safety UE. For instance, the following options may be desirable. The process of listening to OOC signals is battery consuming for D1. In order to limit this power consumption, the mode of operation where D1 provides timing information to D2 and possibly other information can be enabled only in an emergency mode. D1 would switch to the emergency mode after receiving a notification from the eNB, either through broadcasting, higher layer signaling, physical downlink control channel (PDCCH) message, or other suitable mechanisms. Further, in order to limit power consumption, the time/frequency instances where D1 listens to OOC signals may be very or relatively sparse in time.

There may also be a need for security to make sure that the information transmitted to $D_2$ is valid. This may be done using the eNB, where $D_1$ may relay a message from $D_2$ to the eNB. The eNB would respond, and $D_1$ would relay the response to $D_2$. Depending on the content of this message, $D_2$ may know that it can trust $D_1$.

Figure 7:
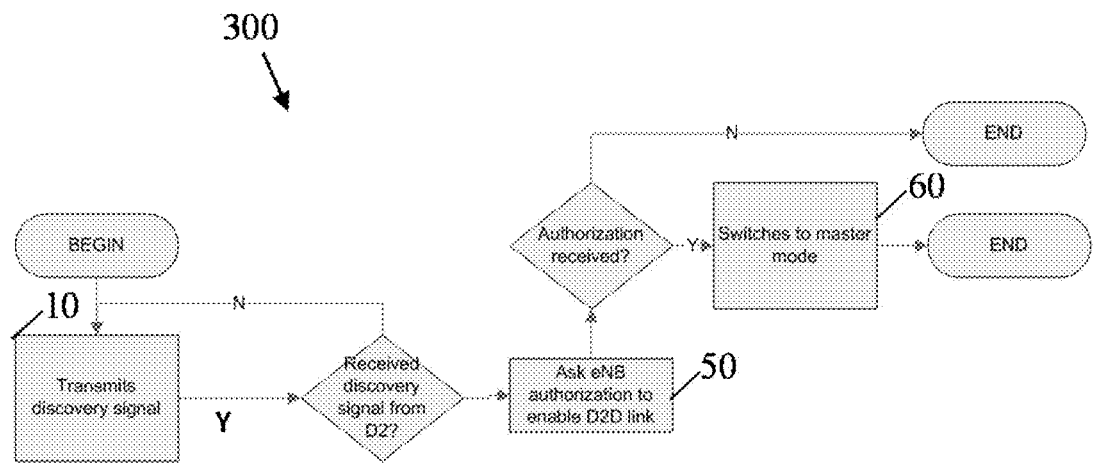
FIG. 7 is a flowchart that illustrates another method embodiment of a device operation for D2D communications.
Figure 8:
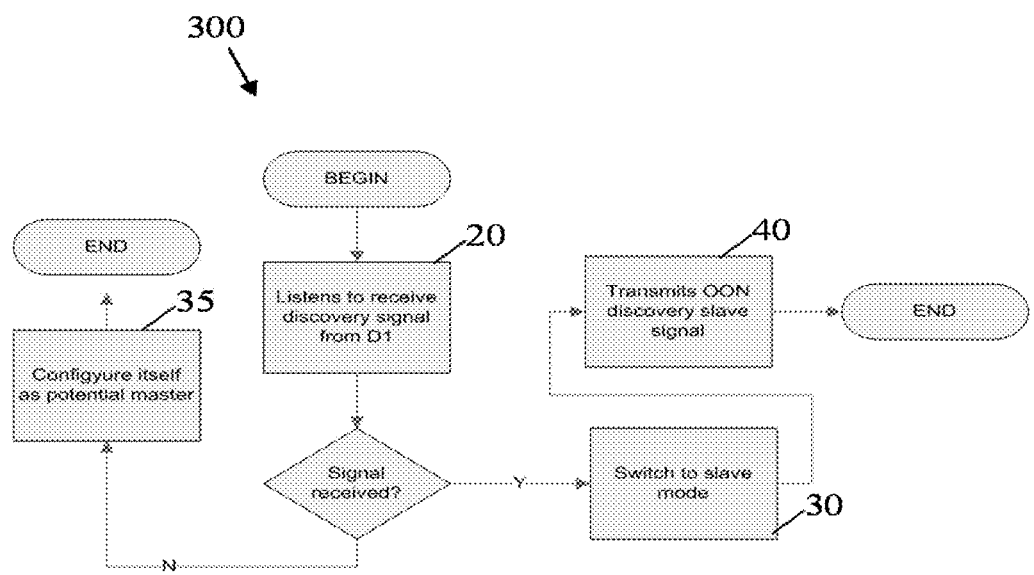
FIG. 8 is a flowchart that illustrates another method embodiment of a device operation for D2D communications.

FIGS. 7 and 8 show the operations of $D_1$ and $D_2$, respectively, as part of another embodiment method 300 to determine a master and slave for D2D communications according to scenario 1 above. This method is similar to the method 100, except that in method 300, the potential master transmits and the potential slave listens. This approach may be more practical in that if the potential slave cannot find any potential master (network included), then the device can simply self-configure as a potential master (stand-alone), and start sending out discovery signals. In this case, the distance to network that the device broadcasts may be very large. At step 10, $D_1$ transmits a discovery signal indicating itself as an IC device. At step 20, $D_2$ listens to receive the discovery signal from $D_1$. If the signal is received, then at step 30, $D_2$ switches to slave state. At step 40, $D_2$ transmits a discovery signal indicating itself as a slave looking for a master unit. When $D_1$ receives the signal from $D_2$, $D_1$ checks with the eNB in order to get approval to establish the D2D link at step 50. Upon approval, $D_1$ switches to master state at step 60. Otherwise, if $D_2$ does not receive the signal from $D_1$, then $D_2$ configures itself as a potential master at step 35. The steps 40 to 60 may not be needed such as if $D_1$ has been preconfigured to be a master.

In scenario 2, it is possible that a potential master connect with multiple slaves. This may be desirable. If not desirable, the potential master can stop sending discovery signals as soon as it receives one signal from a potential slave. However, prohibiting a device of being a master to more than one slave does not allow group communication. Therefore, it is advantageous to have the device as a master to a group of UEs, and manage D2D connection setup/teardown for this group, e.g., similar to how an eNB manages this for the UEs under its coverage. However, there may be a maximum limit on the number of slaves a master can control. In method 300 above, $D_2$ does nothing if $D_1$ cannot be established as the master, and hence $D_2$ does not have any recourse. A solution to this case is to have $D_1$ transmit a message indicating that it cannot be the master (since no approval is received), so that $D_2$ can move on and attempt to find another master.

In scenario 2a above, one device has already established itself as the master. This may be due to the device being already the master in another link, or being configured as such. Similarly, some devices can be configured as slaves only, without the possibility of being a master. Further, in scenario 2a, both devices are OOC. The solutions to determine a master and slave for scenario 2a may be similar to the solutions above (methods 100 and 300) for scenario 1, with the master device acting in a similar manner as the IC device. Without loss of generality, $D_1$ is assumed the UE configured as the master.

Figure 9:
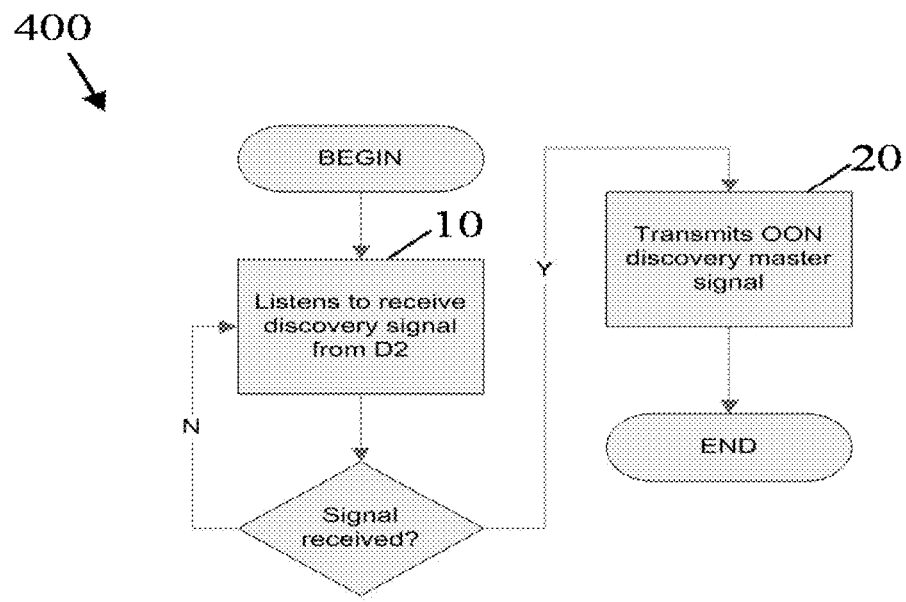
FIG. 9 is a flowchart that illustrates another method embodiment of a device operation for D2D communications.

FIG. 9 shows the operation of $D_1$ as part of an embodiment method 400 to determine a master and slave for D2D communications according to scenario 2a above. In this case, $D_1$ listens and $D_2$ transmits a discovery signal first. At step 10, $D_1$ listens to receive a discovery signal from $D_2$. When the signal is received from $D_2$, $D_1$ transmits an OOC discovery master signal. For this case, the operation for $D_2$ is similar to that described in FIG. 5.

Figure 10:
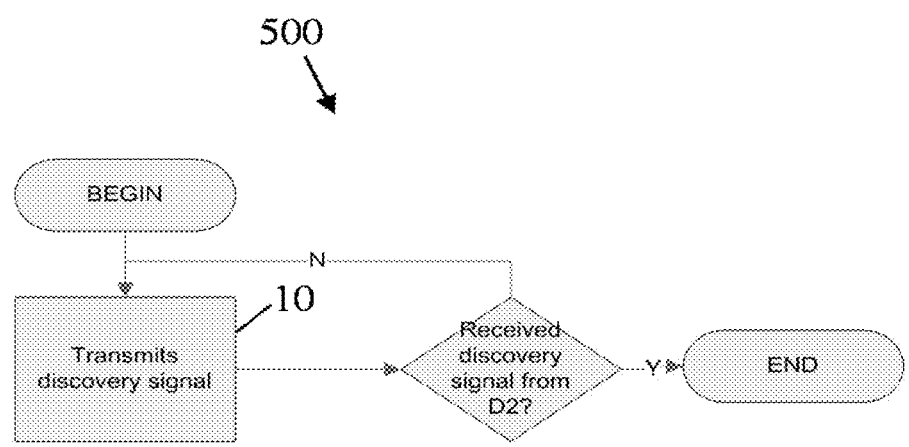
FIG. 10 is a flowchart that illustrates another method embodiment of a device operation for D2D communications.

FIG. 10 shows the operation of $D_1$ as part of another embodiment method 500 to determine a master and slave for D2D communications according to scenario 2a above. In this case, $D_1$ transmits a discovery signal first and $D_2$ listens. At step 10, $D_1$ transmits the discovery signal. $D_1$ then waits to receive a discovery signal from $D_2$. If no signal is received, then $D_1$ repeats transmitting a discovery signal. For this case, the operation for $D_2$ is similar to that described in FIG. 5.

In the case of scenario 2b above, there is no obvious master, e.g., there is no device that is already a master and no device that is IC. In this case, both devices transmit their discovery signals. There are several possibilities to establish the master/slave relationship. For instance, the master may be chosen randomly. This involves some level of negotiation between the two devices. A relatively simple way to implement this process is to have each of the two UEs pseudo-randomly choose a value and transmit it. The UE that has the highest value is determined to be the master, and is recognized as such by both devices. If it is a draw (the generated values are equal), the pseudo-random process is repeated. Alternatively, if the UEs transmit their category or equivalent information, then the highest category UE is recognized by both devices as the master. For instance, a UE in a central command office could have higher category than a UE mounted in a police car, which in turn has higher category than a handheld UE. In case of two same category UEs, another process (such as random selection) needs to be used. It may be possible that some UEs cannot be master (e.g., cheap handheld UEs). In such a case, this can be indicated by a flag, or by assigning the lowest category rating to these UEs.

In yet another simple scheme that requires minimum process and no negotiation, the last device to transmit a signal is automatically established as the slave. In such a scheme, a device listens before transmitting any signal. If the device receives another signal, it transmits its own signal with an indication (e.g., a flag or otherwise) that it is entering as a slave. The first device would likely need to acknowledge its role as master. If the device entering does not receive any other signal, it transmits its regular signal, so that devices entering later on can detect it as a potential master. The master/slave relationship is established at or shortly after discovery. However, due to device mobility, devices entering and leaving the network, and other situations, the master/slave relationship may need to change over time.

In some cases, the slave becomes the master. This can be achieved by having the former slave sending a message to the former master. Similarly, the former master can send a message to the former slave indicating its self-demotion. This message can be embedded in the discovery sequence. Since this process can affect the link reliability, it needs to be carefully implemented. The use of acknowledgement (ACK)/negative ACK (NACK) messaging can avoid one device missing the transition. Since there can be a tree dependency in case of multi-hop communications (e.g., one device can be both a slave to one device and a master to others), the swap of one dependency can affect others. All the related master/slave swaps need to be implemented around the same time to avoid breaking any link. In order to ensure a smooth swap, the messages may include a time stamp (with relative or absolute timing information if the devices are synchronized).

In some scenarios, a device may not be available for communication anymore, e.g., due to leaving the network, turning off, or other reasons. This can also occur in ad-hoc networks, and various solutions can be used. The entire master/slave dependency determination may be started when a device becomes unavailable. If a master leaves the ad-hoc network, its direct slaves may automatically switch to master state after detecting the absence of the master. Further, all the subordinates (slaves) of the leaving device are raised one level in the link hierarchy, which may involve signaling to slaves.

The embodiments and solutions above are used to establish a master and a slave for D2D communication when at least one of the device is OOC. Establishing a master and a slave is a step for establishing the D2D link. After this operation, other issues may also need to be resolved, such as timing, resource allocation, security, group communication, and broadcasting.

A basic assumption about ProSe discovery and communications is that the activity uses the uplink portion of the system. For FDD (frequency-division duplexing), the assumption implies that the uplink band is used. For TDD (time-division duplexing), the uplink subframes of a radio frame are used. As described above, processing PSS/SSS synchronization signals provides preliminary information about the network, such as using TDD or FDD, beginning of a frame (location of frame, location of subframe 0), whether certain downlink subframes use a normal length cyclic prefix ("normal CP") or an extended length cyclic prefix ("extended CP"), and/or center frequency of downlink transmissions (the bandwidth of downlink transmission is communicated using other channels). For TDD, the information can include the center frequency of uplink transmissions. For FDD, the information can indicate whether the center frequency of uplink transmissions can be determined if there is a fixed separation between uplink and downlink carriers. The bandwidth of uplink transmission is communicated using other channels.

There are general guidelines for a timing master. For devices in the in-network coverage region, they can detect network signaling and thus can track the signals transmitted by an eNB. In this case, the devices are slaves to network timing. For devices in the extended-coverage region, they can detect basic network signaling. As a result, they can set their timing accordingly. Due to propagation delay and channel impairments, there can be significant difference (e.g., many microseconds) between the transmission of the first sample of a radio frame at an eNB and reception of that first sample at a device.

For a device in the in-network coverage region, the eNB sets rules when the device can perform ProSe discovery and ProSe communication. It is assumed that ProSe discovery and ProSe communication utilize the uplink portion of the spectrum. Although the eNB can indicate which uplink resources (resource block (RB) pairs) and subframes to use for devices in the in-network coverage region, there are some suggested combinations that can facilitate timing and can improve system performance.

Figure 13:
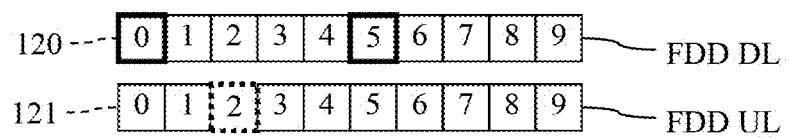
FIG. 13 is a diagram that illustrates example subframes for uplink and downlink communications.
Figure 13:
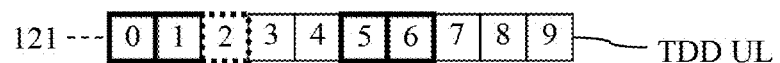

FIG. 13 shows a plurality of subframes configured for uplink and downlink communications. In general, based on the frame structure, a UE can determine that subframes 0 and 5 are downlink for FDD (1205), and 0, 1, 5, and 6 for TDD (1215). Similarly, at least subframe 2 is available on the uplink for TDD systems (1215). For uplink communications in FDD systems (1210), subframe 2 is available. The uplink cyclic prefix length and the uplink bandwidth may be unknown to devices in the extended-coverage region because the length and bandwidth are signaled. Hence, for devices in the extended-coverage region, it is preferred that the center 6 RBs (corresponding to uplink carrier) be used as well as communications in subframe 2. Thus, devices in the in-network coverage region can detect devices in the extended-network coverage region with minimal power, and devices in the extended-network coverage region know when discovery can occur and when "good times" for ProSe communications take place.

For example, when a device detects a PSS signal periodically transmitted by the eNB, such as every 5 ms as described above, the device can acquire some knowledge of subframe timing. If the device detects both the PSS and SSS, the device can determine frame timing (e.g., where subframe 0 starts, subframe timing (e.g. when subframes 0, 1, 5, 6 occur), the cyclic prefix used (e.g. normal vs. extended), and/or the type of frame structure used (where frame structure type 1 corresponds to FDD, and frame structure type 2 corresponds to TDD). A plurality of rules can be defined to determine when a device can receive an IC discovery signal such as a predefined subframe (subframe 2 for a TDD configuration if D2D signal transmissions occur on the uplink).

Figure 14:
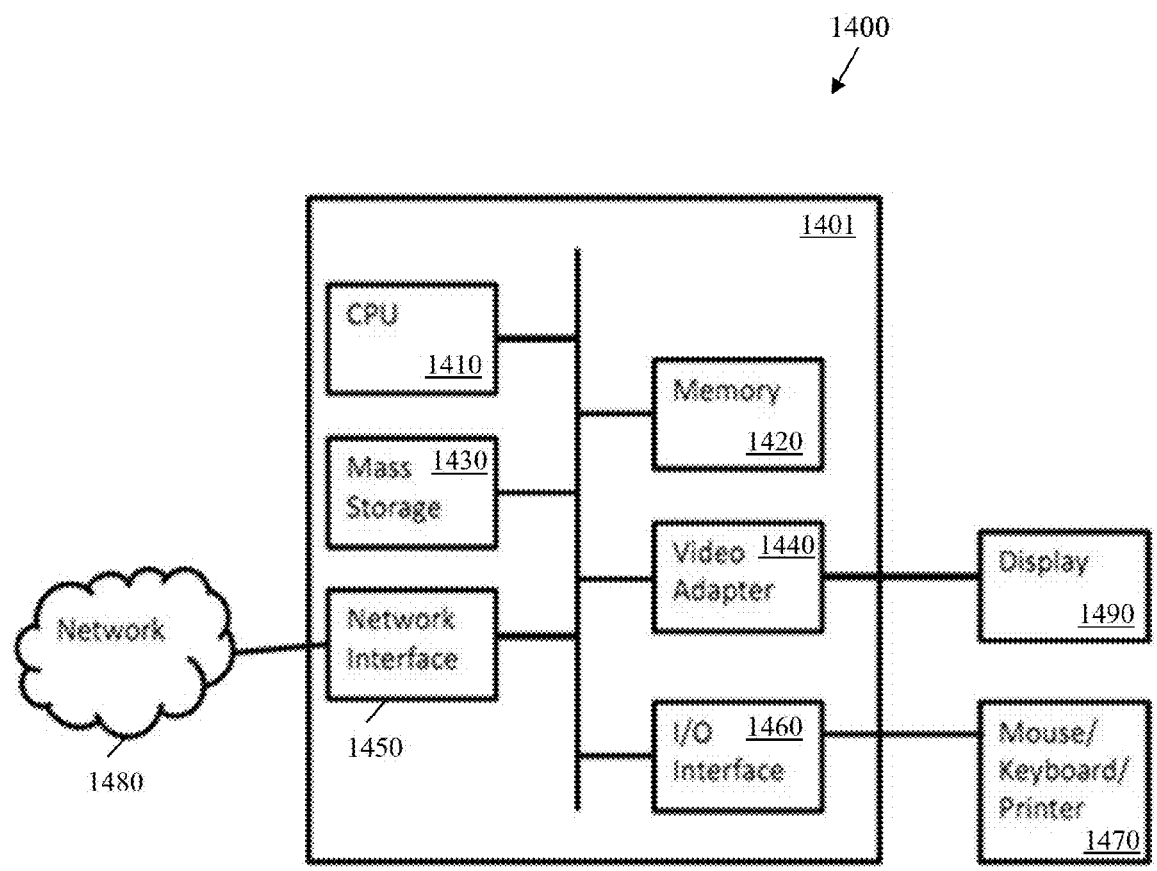
FIG. 14 is a diagram of a processing system that can be used to implement various embodiments.

FIG. 14 is a block diagram of a processing system 1400 that can be used to implement various embodiments. For instance the processing system 1400 can be part of a UE or other network devices. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1400 may comprise a processing unit 1401 equipped with one or more input/output devices, such as a speaker, microphone, mouse, touchscreen, keypad, keyboard, printer, display, and the like. The processing unit 1401 may include a central processing unit (CPU) 1410, a memory 1420, a mass storage device 1430, a video adapter 1440, and an I/O interface 1460 connected to a bus. The bus may be one or more of any type of several bus architectures including a memory bus or memory controller, a peripheral bus, a video bus, or the like.

The CPU 1410 may comprise any type of electronic data processor. The memory 1420 may comprise any type of system memory such as static random access memory (SRAM), dynamic random access memory (DRAM), synchronous DRAM (SDRAM), read-only memory (ROM), a combination thereof, or the like. In an embodiment, the memory 1420 may include ROM for use at boot-up, and DRAM for program and data storage for use while executing programs. In embodiments, the memory 1420 is non-transitory. The mass storage device 1430 may comprise any type of storage device configured to store data, programs, and other information and to make the data, programs, and other information accessible via the bus. The mass storage device 1430 may comprise, for example, one or more of a solid state drive, hard disk drive, a magnetic disk drive, an optical disk drive, or the like.

The video adapter 1440 and the I/O interface 1460 provide interfaces to couple external input and output devices to the processing unit. As illustrated, examples of input and output devices include a display 1490 coupled to the video adapter 1440 and any combination of mouse/keyboard/printer 1470 coupled to the I/O interface 1460. Other devices may be coupled to the processing unit 1401, and additional or fewer interface cards may be utilized. For example, a serial interface card (not shown) may be used to provide a serial interface for a printer.

The processing unit 1401 also includes one or more network interfaces 1450, which may comprise wired links, such as an Ethernet cable or the like, and/or wireless links to access nodes or one or more networks 1480. The network interface 1450 allows the processing unit 1401 to communicate with remote units via the networks 1480. For example, the network interface 1450 may provide wireless communication via one or more transmitters/transmit antennas and one or more receivers/receive antennas. In an embodiment, the processing unit 1401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a user equipment (UE) for selecting a synchronization master for device-to-device (D2D) communication, the method comprising:
   receiving, by a first UE, a discovery signal from a second UE, the discovery signal comprising a timing reference and a synchronization signal that indicates a synchronization state of the second UE, the synchronization signal being an in-coverage signal when the second UE is inside a coverage area of a cellular network and an out-of-coverage signal when the second UE is outside of the coverage area of the cellular network, the discovery signal having been received on a predefined uplink carrier;
   determining whether the first UE is to act as a timing slave entity or a timing master entity during a D2D communications session between the first UE and the second UE based on whether the synchronization signal received from the second UE is the in-coverage signal or the out-of-coverage signal;
   participating, by the first UE, in the D2D communication session with the second UE over the predefined uplink carrier as the timing slave entity or the timing master entity, wherein the first UE synchronizes the D2D communication session according to the timing reference received from the second UE when the first UE is the timing slave entity, and wherein the first UE synchronizes the D2D communication session according to its own timing reference when the first UE is the timing master entity;
   receiving, by the first UE, authorization from the cellular network, the authorization indicating the first UE is permitted to act as the timing master entity; and
   switching, by the first UE, to a timing master mode in response to receiving the authorization from the cellular network.

2. The method of claim 1, wherein the discovery signal indicates whether the second UE is synchronized with the cellular network or is otherwise outside the coverage area of the cellular network.

3. The method of claim 2, wherein the discovery signal indicates a number of hops that separates the second UE from a base station of the cellular network.

4. The method of claim 1 further comprising:
   detecting, by the first UE, a power level of the received discovery signal, wherein a second discovery signal is transmitted by the first UE in accordance with the detected power level of the received discovery signal.

5. The method of claim 1 further comprising:
   transmitting, by the first UE, a second discovery signal upon receiving a signal without a timing reference from the second UE over the predefined uplink carrier.

6. A method by a user equipment (UE) for selecting a synchronization master for device-to-device (D2D) communication, the method comprising:
   receiving, by a first UE, a discovery signal on a predefined uplink carrier from a second UE, the discovery signal including a timing reference and a synchronization signal indicating a synchronization state of the second UE;
   determining whether the first UE or the second UE is to act as a timing master entity during a D2D communications session between the first UE and the second UE based on the synchronization signal received from the second UE;
   participating, by the first UE, in the D2D communication session with the second UE over the predefined uplink carrier, wherein the first UE synchronizes the D2D communication session according to the timing reference received from the second UE when the second UE is the timing master entity, and wherein the first UE synchronizes the D2D communication session according to its own timing reference when the first UE is the timing master entity;
   receiving, by the first UE, authorization from a cellular network, the authorization indicating that the first UE is permitted to act as the timing master entity; and
   switching, by the first UE, to a timing master mode in response to receiving the authorization from the cellular network.

7. The method of claim 6, wherein the first UE is in coverage of a cellular network, and wherein a second discovery signal is transmitted by the first UE upon determining, according to a signal quality of the received discovery signal, that the second UE is outside of a coverage area of the cellular network.

8. The method of claim 6, wherein the received discovery signal indicates a number of hops that separates the second UE from a base station of a cellular network, and wherein the first UE determines whether the first UE or the second UE is to act as the timing master entity according to the number of hops between the second UE and the base station.

9. The method of claim 6, wherein the first UE determines whether the first UE or the second UE is to act as the timing master entity according to a power level of the discovery signal.

10. A first user equipment (UE) for selecting a synchronization master for device-to-device (D2D) communication, the first UE comprising:
   at least one processor; and
   a non-transitory computer readable storage medium storing programming for execution by the at least one processor, the programming including instructions to:
   receive a discovery signal from a second UE, the discovery signal comprising a timing reference and a synchronization signal that indicates a synchronization state of the second UE, the synchronization signal being an in-coverage signal when the second UE is inside a coverage area of a cellular network and an out-of-coverage signal when the second UE is outside of the coverage area of the cellular network, the discovery signal having been received on a predefined uplink carrier;
   determine whether the first UE is to act as a timing slave entity or a timing master entity during a D2D communications session between the first UE and the second UE based on whether the synchronization signal received from the second UE is the in-coverage signal or the out-of-coverage signal; and
   participate in the D2D communication session with the second UE over the predefined uplink carrier as the timing slave entity or the timing master entity, wherein the first UE synchronizes the D2D communication session according to the timing reference received from the second UE when the first UE is the timing slave entity, and wherein the first UE synchronizes the D2D communication session according to its own timing reference when the first UE is the timing master entity;
   receive authorization from the cellular network, the authorization indicating the first UE is permitted to act as the timing master entity; and
   switch to a timing master mode in response to receiving the authorization from the cellular network.

11. The first UE of claim 10, wherein the discovery signal indicates whether the second UE is synchronized with the cellular network or is otherwise outside the coverage area of the cellular network.

12. The first UE of claim 11, wherein the discovery signal indicates a number of hops that separates the second UE from a base station of the cellular network.

13. The first UE of claim 10, wherein the programming further includes instructions to: detect a power level of the received discovery signal, wherein a second discovery signal is transmitted by the first UE in accordance with the detected power level of the received discovery signal.

14. The first UE of claim 10, wherein the programming further includes instructions to:
   transmit a second discovery signal upon receiving a signal without a timing reference from the second UE over the predefined uplink carrier.

15. A first user equipment (UE) for selecting a synchronization master for device-to-device (D2D) communication, the first UE comprising:
   at least one processor; and
   a non-transitory computer readable storage medium storing programming for execution by the at least one processor, the programming including instructions to:
   receive a discovery signal on a predefined uplink carrier from a second UE, the discovery signal including a timing reference and a synchronization signal indicating a synchronization state of the second UE;
   determine whether the first UE or the second UE is to act as a timing master entity during a D2D communications session between the first UE and the second UE based on the synchronization signal received from the second UE;
   participate in the D2D communication session with the second UE over the predefined uplink carrier, wherein the first UE synchronizes the D2D communication session according to the timing reference received from the second UE when the second UE is the timing master entity, and wherein the first UE synchronizes the D2D communication session according to its own timing reference when the first UE is the timing master entity;
   receive authorization from a cellular network, the authorization indicating the first UE is permitted to act as the timing master entity; and
   switch to a timing master mode in response to receiving the authorization from the cellular network.

16. The first UE of claim 15, wherein the first UE is in coverage of a cellular network, and wherein a second discovery signal is transmitted by the first UE upon determining, according to a signal quality of the received discovery signal, that the second UE is outside of a coverage area of the cellular network.

17. The first UE of claim 15, wherein the received discovery signal indicates a number of hops that separates the second UE from a base station of a cellular network, and wherein the first UE determines whether the first UE or the second UE is to act as the timing master entity according to the number of hops between the second UE and the base station.

18. The first UE of claim 15, wherein the first UE determines whether the first UE or the second UE is to act as the timing master entity according to a power level of the discovery signal.

* * * * *